US012452394B2

(12) United States Patent
Kim et al.

(10) Patent No.: US 12,452,394 B2
(45) Date of Patent: Oct. 21, 2025

(54) IMAGE SIGNAL PROCESSOR PROCESSING IMAGE DATA HAVING NON-BAYER PATTERN AND IMAGE PROCESSING DEVICE INCLUDING SAME

(71) Applicant: SAMSUNG ELECTRONICS CO., LTD., Suwon-Si (KR)

(72) Inventors: Ildo Kim, Suwon-Si (KR); Pilsu Kim, Hwaseong-Si (KR); Dongwoo Lee, Yongin-Si (KR); Na-Ri Im, Suwon-Si (KR); Dong-Bum Choi, Suwon-Si (KR); Jongseong Choi, Hwaseong-Si (KR); Sukhwan Lim, Seongnam-Si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 435 days.

(21) Appl. No.: 17/983,466

(22) Filed: Nov. 9, 2022

(65) Prior Publication Data

US 2023/0231979 A1   Jul. 20, 2023

(30) Foreign Application Priority Data

Jan. 14, 2022   (KR) .................. 10-2022-0006159

(51) Int. Cl.
| | |
|---|---|
| *H04N 9/69* | (2023.01) |
| *G06T 3/4015* | (2024.01) |
| *G06T 5/70* | (2024.01) |
| *G06T 7/90* | (2017.01) |
| *G06V 10/60* | (2022.01) |

(52) U.S. Cl.
CPC ............ *H04N 9/69* (2013.01); *G06T 3/4015* (2013.01); *G06T 5/70* (2024.01); *G06T 7/90* (2017.01); *G06V 10/60* (2022.01); *G06T 2207/10024* (2013.01)

(58) Field of Classification Search
CPC .......... H04N 9/69; H04N 23/85; H04N 25/76; H04N 25/78; H04N 25/134; H04N 9/3182; H04N 25/61; H04N 25/13; G06T 3/4015; G06T 5/70; G06T 7/90; G06T 2207/10024; G06V 10/60; G06V 10/147
USPC ....................................... 382/167
See application file for complete search history.

(56) References Cited

U.S. PATENT DOCUMENTS

| | | |
|---|---|---|
| 8,237,830 B2 | 8/2012 | Jannard et al. |
| 8,446,484 B2 | 5/2013 | Muukki et al. |
| 8,723,993 B2 | 5/2014 | Hayashi |
| 9,538,152 B2 | 1/2017 | Shabtay et al. |
| 9,582,853 B1 | 2/2017 | Oh et al. |
| 10,735,698 B2 * | 8/2020 | Siddiqui .............. G06T 7/90 |
| 2009/0066820 A1 * | 3/2009 | Jiang .................. H04N 23/12 348/E9.002 |
| 2010/0309351 A1 * | 12/2010 | Smith .................. H04N 25/00 348/E5.091 |

(Continued)

*Primary Examiner* — Ali Bayat
(74) *Attorney, Agent, or Firm* — Fish & Richardson P.C.

(57) ABSTRACT

An image processing device includes; an image sensor including pixels arranged in a non-Bayer pattern and configured to generate non-Bayer pattern image data in response to electrical signals generated by the pixels, and an image signal processor configured to determine an indexing value indicating a color of a target pixel among the pixels and directly process the non-Bayer pattern image data in response to the indexing value.

20 Claims, 10 Drawing Sheets

(56) References Cited

U.S. PATENT DOCUMENTS

| | | | | |
|---|---|---|---|---|
| 2011/0150330 A1* | 6/2011 | Jannard | ............... | H04N 19/436 |
| | | | | 382/166 |
| 2014/0226036 A1* | 8/2014 | Jannard | ................. | H04N 19/44 |
| | | | | 348/231.99 |
| 2017/0366723 A1* | 12/2017 | Kurata | ................. | H04N 25/131 |

* cited by examiner

IMAGE SIGNAL PROCESSOR PROCESSING IMAGE DATA HAVING NON-BAYER PATTERN AND IMAGE PROCESSING DEVICE INCLUDING SAME

CROSS-REFERENCE TO RELATED APPLICATION

This application claims priority under 35 U.S.C. § 119 to Korean Patent Application No. 10-2022-0006159 filed on Jan. 14, 2022 in the Korean Intellectual Property Office, the subject matter of which is hereby incorporated by reference in its entirety.

BACKGROUND

The inventive concept relates generally to image signal processors, and more particularly, to image signal processors capable of processing image data having a non-Bayer pattern (hereafter, "non-Bayer pattern image data") without converting the non-Bayer pattern image data into image data having a Bayer pattern (hereafter "Bayer pattern image data").

An image sensor may include a charge coupled device (CCD) image sensor, a complementary metal-oxide semiconductor (CMOS) image sensor (CIS), etc. CMOS image sensors may include pixels converting received electromagnetic energy (hereafter, "incident light") into a corresponding electrical signal using a constituent photoelectric conversion element. CMOS image sensors obtain information associated with a captured image using an electrical signal generated by each pixel. In this regard, pixels have been arranged in a Bayer pattern, a tetra pattern, or a Nona pattern.

SUMMARY

Certain embodiments of the inventive concept provide image signal processors capable of directly processing non-Bayer pattern image data without prior requirement of converting the non-Bayer pattern image data into Bayer pattern image data. Other embodiments of the inventive concept provide methods of directly processing non-Bayer pattern image data without prior requirement of converting the non-Bayer pattern image data into Bayer pattern imager data.

According to an embodiment of the inventive concept, an image signal processor may include; a color position controller configured to determine an indexing value indicating a color of a target pixel in non-Bayer pattern image data in response to pixel coordinates of the target pixel and a first value indicating a mode value for an image sensor providing the non-Bayer pattern image data, a Bayer domain processing block configured to process the non-Bayer pattern image data in response to the indexing value, generate 3-channel data, and provide an output, and an RGB/YUV domain processing block configured to provide 3-channel pixel data in response to the output provided by the Bayer domain processing block.

According to an embodiment of the inventive concept, an image processing device may include; an image sensor including pixels arranged in a non-Bayer pattern and configured to generate non-Bayer pattern image data in response to electrical signals generated by the pixels, and an image signal processor configured to determine an indexing value indicating a color of a target pixel among the pixels and directly process the non-Bayer pattern image data in response to the indexing value.

According to an embodiment of the inventive concept, a method of processing image data may include; receiving non-Bayer pattern image data from an image sensor, receiving a first value indicating a mode of the image sensor, determining an indexing value indicating a color of a target pixel among the non-Bayer pattern image data in response to pixel coordinates for the target pixel and the first value, and providing the indexing value to a Bayer domain processing block of the image signal processor.

BRIEF DESCRIPTION OF THE DRAWINGS

Advantages, benefits and features, as well as the making and use of the inventive concept may be better understood upon consideration of the following detailed description together with the accompanying drawings, in which.

DETAILED DESCRIPTION

Throughout the written description and drawings, like reference numbers and labels are used to denote like or similar elements, components, features and/or method steps. Here, certain components and features may be referred to as a "unit", "module", "block", etc. Functional units, modules and/or blocks may be variously implemented in software, firmware and/or hardware. In this regard, software may be implemented as machine code, firmware, embedded code, and/or application code. Hardware may be implemented as electrical circuits, electronic circuits, processors, computers, integrated circuits, integrated circuit cores, various sensors, microelectromechanical systems (MEMS), passive elements, and/or active elements.

It should noted at this juncture that conventional image signal processors routinely convert non-Bayer image data received from an image sensor into Bayer pattern image data before performing various processing on the Bayer pattern image data. In this regard, for example, conventional image signal processors may generate 3-channel image data in accordance with portions of the Bayer pattern image data. Unfortunately, image data may be lost during the conversion of non-Bayer pattern image data into Bayer pattern image data. The conversion of non-Bayer pattern image data into Bayer pattern image data consumes considerable time and electrical power. Accordingly, a device and/or method of processing image data capable of preventing image data loss due to conversion of non-Bayer pattern image data into Bayer pattern image data has been deemed desirable.

Hereafter, embodiments of the inventive concept may be understood as "direct(ly) processing" non-Bayer pattern image data, as opposed to comparative, conventional examples that indirectly process non-Bayer pattern image data by converting the non-Bayer pattern image data into Bayer pattern image data.

Of further note, image signal processors often perform various processing in accordance with the color of a pixel (hereafter, "pixel color"). Accordingly, a component and/or method of processing capable of determining, in real time, pixel color during the direct processing of non-Bayer pattern image data is also deemed desirable.

Figure 1:
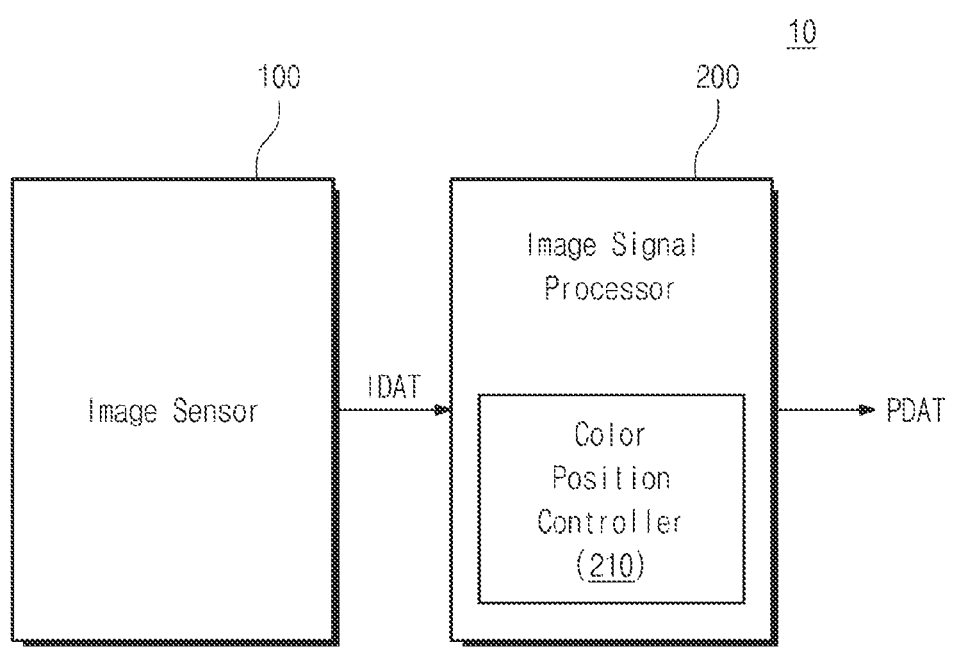
FIG. 1 is a block diagram illustrating an image processing device according to embodiments of the inventive concept.

FIG. 1 is a block diagram illustrating an image processing device 10 according to embodiments of the inventive concept and including an image sensor 100 and an image signal processor 200.

The image sensor 100 may generate image data (IDAT) in response to received incident light (e.g., electromagnetic energy at least partially in the visual spectrum, as received through a focusing lens). The image sensor 100 may include a pixel array including a multiplicity of pixels, each respectively capable of converting incident light into an electrical signal. In some embodiments, the image sensor 100 may include pixels arranged in a non-Bayer pattern.

In some embodiments, the image sensor 100 may include a CMOS image sensor, a CCD image sensor, or other type of image sensor. For example, the image sensor 100 may provide image data IDAT by performing correlated double sampling (CDS) on signals received from the pixel array.

In some embodiment, the image processing device 10 may include multiple image sensors, wherein the various image sensors may perform the same or different functions, may exhibit the same or different performance profiles, and/or may be defined in accordance with the same or different characteristics. Here, at least one the image sensors may include pixels arranged in a Bayer pattern and providing Bayer pattern image data, while another one of the image sensors may include pixels arranged in a non-Bayer pattern and providing non-Bayer pattern image data.

The image signal processor 200 may process the image data IDAT provided by the image sensor 100 in order to generate corresponding pixel data (PDAT). In this regard, the image signal processor 200 may perform "additional processing" which may include at least one of, for example; black level control, bad pixel correction, lens shading correction, white balancing, and color correction on the image data IDAT.

In some embodiments, the image signal processor 200 may be used to convert non-Bayer pattern image data IDAT provided by the image sensor 100 into Bayer pattern image data pattern. (This conversion process may be referred to hereafter as "remosaic processing"). And thereafter, the image signal processor 200 may perform additional processing on the resulting Bayer pattern image data. Then, following the additional processing, the image signal processor 200 may generate a 3-channel Red-Green-Blue (or "RGB") data (e.g., assuming the use of a RGB color model) by performing an interpolation-based demosaic processing on the Bayer pattern image data.

However, as noted above, image data may be lost during the remosaic and demosaic processing, and valuable time, computational cycles, and/or electrical power may be needlessly expended.

Recognizing these potential drawbacks, image processing systems, image signals processors, and methods of processing image data according to embodiments of the inventive concept, do not necessarily perform remosaic processing of non-Bayer pattern image data IDAT. To this end, the image signal processor 200 of FIG. 1 may include a color position controller 210 capable of determining pixel color(s) for the image data IDAT received from the image sensor 100.

Figure 2:
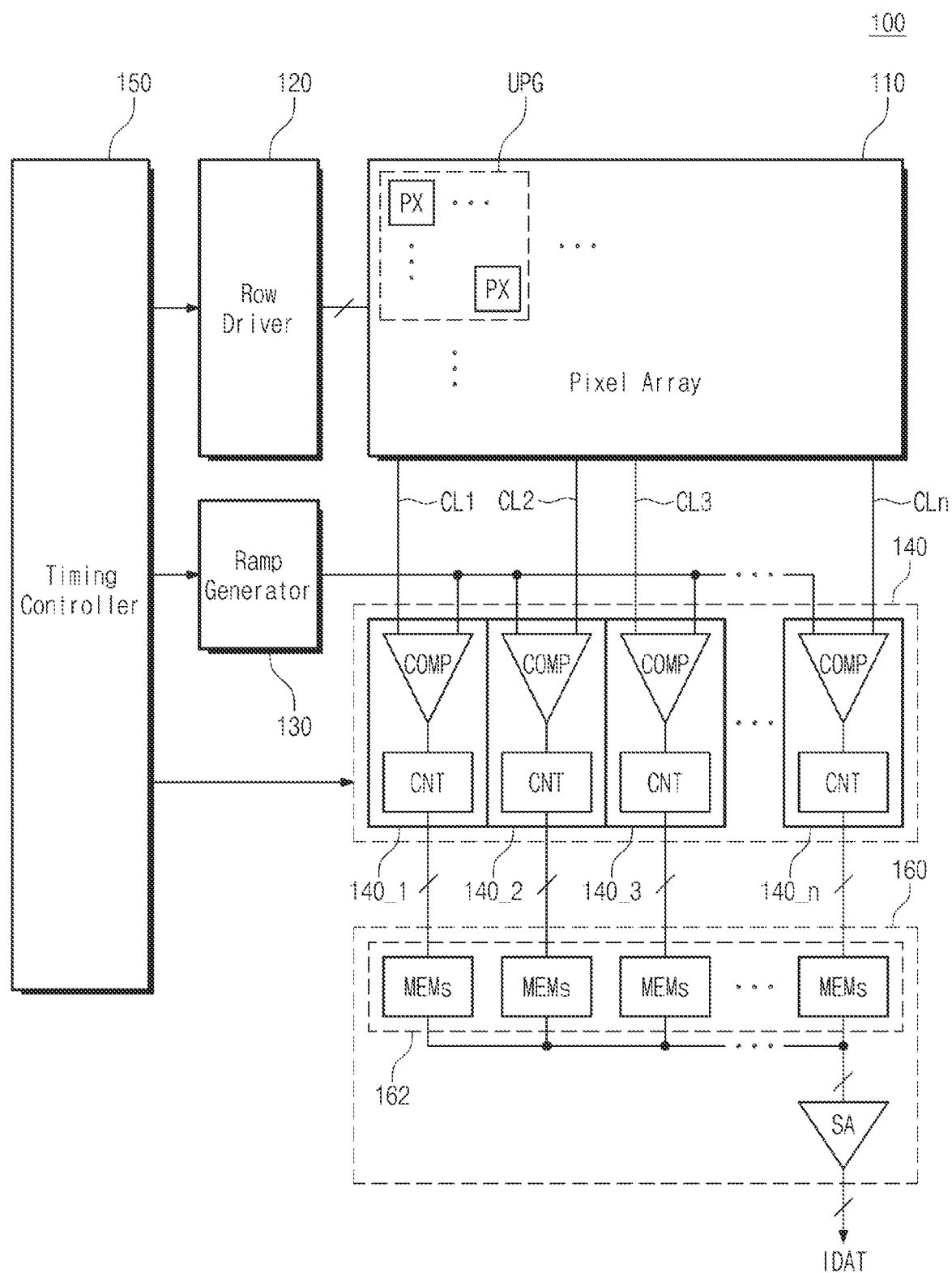
FIG. 2 is a block diagram further illustrating in one example the image sensor of FIG. 1.

FIG. 2 is a block diagram further illustrating in one example the image sensor 100 of FIG. 1. Here, the image sensor 100 may include a pixel array 110, a row driver 120, a ramp signal generator 130, an analog-to-digital converting block (hereinafter, "ADC block") 140, a timing controller 150, and a buffer 160.

The pixel array 110 may include pixels PXs arranged (e.g.,) in a matrix of rows and columns. Each of the pixels PXs may include a photoelectric conversion element. Thus, each of the pixels PXs may sense incident light using the photoelectric conversion element and may convert the sensed incident light into an electrical signal (hereinafter, "pixel signal"). Here, for example, the photoelectric conversion element may include at least one of a photo diode, a photo transistor, a photo gate, and a pinned photo diode.

The pixel array 110 may further arrange a number of pixels PXs into respective unit pixel groups (UPG). In this regard, the term "unit pixel group" (or UPG) may denote a pixel group of minimum unit size by which like color patterns are repeated. For example, in a case where the pixel array 110 includes pixels arranged in a Bayer pattern, the unit pixel group UPG may include two green pixels, one red pixel, and one blue pixel. Alternatively, for example, in a case where the pixel array 110 includes pixels arranged in a tetra pattern, the unit pixel group UPG may include 8 green pixels, 4 red pixels, and 4 blue pixels. (See, e.g., FIG. 3). Alternatively, for example, in a case where the pixel array 110 includes pixels arranged in a Nona pattern, the unit pixel group UPG may include 18 green pixels, 9 red pixels, and 9 blue pixels. (See, e.g., FIG. 4).

Pixels PXs included in (or "of") a unit pixel group UPG may share at least one floating diffusion region, and pixels PXs sharing the same floating diffusion region may be connected to the same column line. For example, in a case where pixels PXs of a pixel group PG share one floating diffusion region, the pixels PXs of each unit pixel group UPG may be connected to one column line (e.g., CL1). Alternatively, in a case where pixels PXs of a pixel group PG share more than one floating diffusion region, pixels PXs of the unit pixel group UPG may be connected to more than one column line.

A pixel group PG may include pixels PXs of like type providing information related to the same color. For example, the unit pixel group UPG may include red pixels "R" that convert incident light of a red spectrum into an electrical signal, green pixels Gr/Gb that convert incident light of a green spectrum into an electrical signal, or blue pixels "B" that convert incident light of a blue spectrum into an electrical signal. To this end, one or more color filters may be disposed over the unit pixel groups UPGs to implement a multi-color filter array (multi-CFA).

The row driver 120 may be used to select and drive a row of the pixel array 110. The row driver 120 may be used to decode an address and/or control signal(s) provided by the timing controller 150, and may generate control signals for selecting and driving the selected row of the pixel array 110. Here, the control signals may variously include a pixel selecting signal, a floating diffusion region reset signal, a column selecting signal, etc.

Under control of the timing controller 150, the ramp signal generator 130 may be used to generate a ramp signal. For example, the ramp signal generator 130 may operate in response to control signals such as a ramp enable signal, a mode signal, etc. When the ramp enable signal is activated, the ramp signal generator 130 may generate the ramp signal having a slope set in accordance with the mode signal.

The ADC block 140 may be used to convert an analog signal (e.g., pixel signal(s)) provided by the pixel array 110 into a corresponding digital signal (or digital data). In some embodiments, the ADC block 140 may include multiple ADCs (e.g., ADCs 140_1 to 140_n), wherein each of the Cs includes a comparator COMP and a counter CNT. Here, the comparator COMP may be used to compare a pixel signal provided through a column line (i.e., one of CL1 to CLn) connected with the comparator COMP with the ramp signal in order to generate a comparison result. In some embodiments, the comparator COMP may operate in accordance with a correlated double sampling (CDS) technique in order to obtain a reset signal and an image signal from a pixel signal and to extract a difference between the reset signal and the image signal as an effective signal component.

The counter CNT may be used to count pulses of an output signal of the corresponding comparator COMP. For example, the counter CNT may operate in response to various control signals generated by the timing controller 150, such as a counter clock signal, a counter reset signal for controlling a reset of the counter CNT, and an inversion signal for inverting an internal bit of the counter CNT. The counter CNT may count a comparison result signal in response to the counter clock signal and may provide a digital signal corresponding to a counting result.

The counter CNT may include an up/down counter, a bit-wise inversion counter, and the like. An operation of the bit-wise inversion counter may be similar to an operation of the up/down counter. For example, the bit-wise inversion counter may perform a function of performing only up-counting and a function of converting all internal bits of the counter to obtain the 1's complement when a specific signal is received. The bit-wise inversion counter may perform a reset count and may then invert a result of the reset count into the 1's complement, that is, a negative value.

The timing controller 150 may be used to generate control signal(s) and/or clock signal(s) used to control operation and/or timing of the row driver 120, the ramp signal generator 130, and/or the ADC block 140 (e.g., the counter CNT).

The buffer 160 may include a group of memories MEMs 162 and at least one sense amplifier SA. Each of the memories MEMs in the group of memories 162 may be used to store a digital signal provided by a corresponding ADC. The sense amplifier SA may sense and amplify the digital signals stored in the memories MEMs. The sense amplifier SA may provide the amplified digital signals as the image data IDAT. For example, the image data IDAT may include information about a color of an object and information about a phase of the object.

Figure 3:
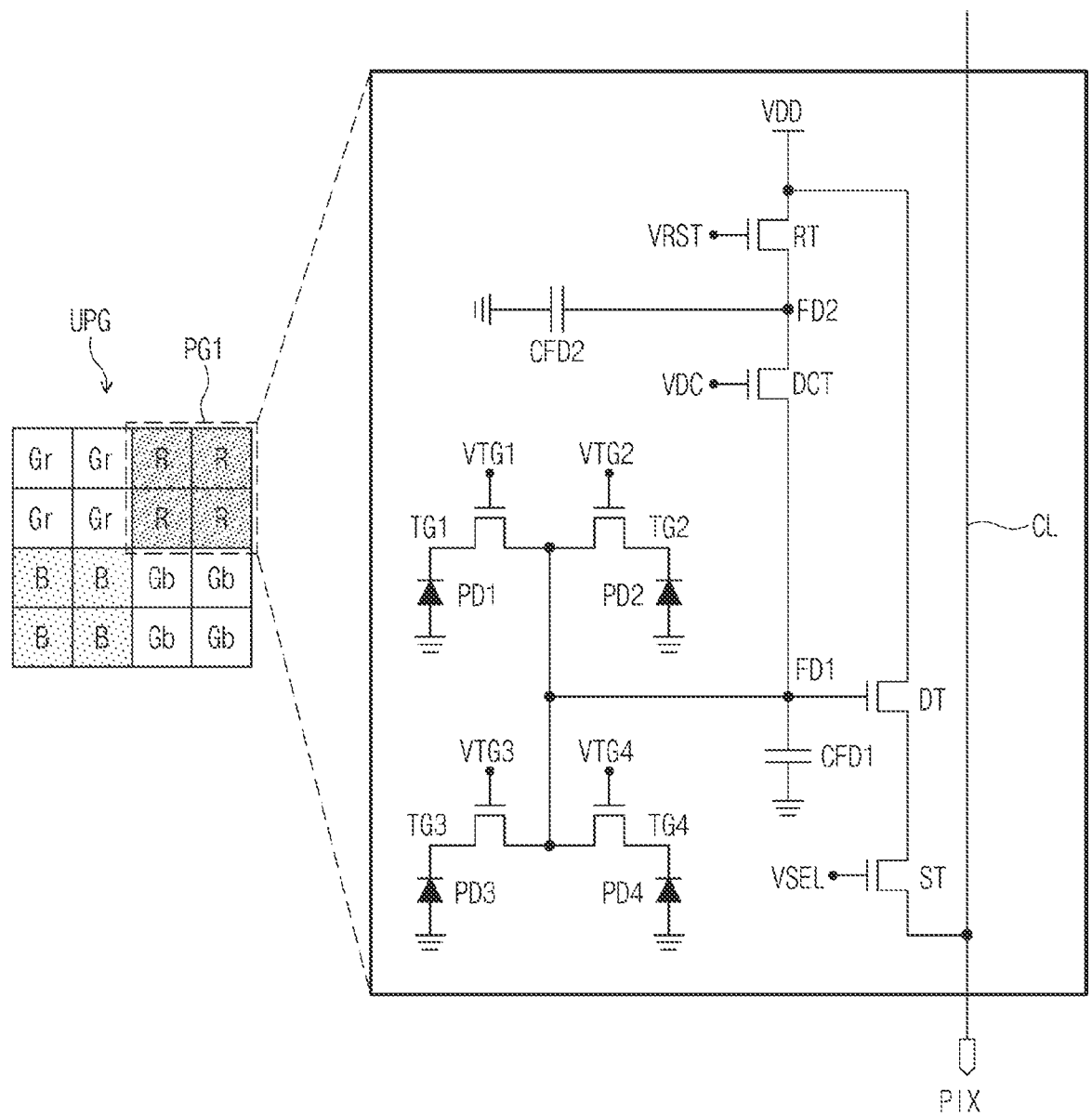
FIGS. 3 and 4 are respective circuit diagrams illustrating possible examples of the pixel group of FIG. 2.

FIG. 3 is a circuit diagram further illustrating in one example an exemplary pixel group (e.g., a first pixel group PG1) of FIG. 2. Here, the first unit pixel group PG1 is assumed to include 16 pixels arranged in a tetra pattern. That is, the unit pixel group UPG of FIG. 3 may include a plurality of pixel groups including the first pixel group PG1, wherein the pixels of the first pixel group PG1 are assumed to share the same floating diffusion region (e.g., a first floating diffusion region FD1).

In this regard, a first pixel of the first pixel group PG1 may include a photoelectric conversion element PD1, a transfer transistor TG1, a dual conversion transistor DCT, a reset transistor RT, a drive transistor DT, and a select transistor ST. The remaining pixels of the first pixel group PG1 may have a similar configuration. The pixels of the first pixel group PG1 may share the dual conversion transistor DCT, the reset transistor RT, the drive transistor DT, and the select transistor ST.

The transfer transistors TG1 to TG4 may be used to selectively transfer electrical charge generated by the photoelectric conversion elements PD1 to PD4 to a first floating diffusion region FD1. For example, while the transfer transistor TG1 is turned ON by a transfer signal VTG1 received from the row driver 120 (refer to FIG. 2), electrical charge from the photoelectric conversion element PD1 may be accumulated in the first floating diffusion region FD1. Operation of the transfer transistors TG2 to TG4 may be similar to the operation of the transfer transistor TG1. Accordingly, electrical charge from the photoelectric conversion elements PD2 to PD4 may be accumulated in the first floating diffusion region FD1. Here, first ends of the transfer transistors TG1 to TG4 may be respectively connected with the photoelectric conversion elements PD1 to PD4, and second ends thereof may be commonly connected with the first floating diffusion region FD1.

Thus, the first floating diffusion region FD1 may accumulate electrical charge provided by at least one of the photoelectric conversion elements PD1 to PD4. In some embodiments, a capacitance of the first floating diffusion region FD1 is understood as a first capacitance CFD1. The first floating diffusion region FD1 may be connected with a gate terminal of the drive transistor DT that operates as a source follower amplifier. As a result, a voltage potential corresponding to the accumulated electrical charge of the first floating diffusion region FD1 may be developed.

The reset transistor RT may be selectively turned ON by a reset signal VRST and may provide a reset voltage (e.g., a power supply voltage VDD) to the first floating diffusion region FD1. As a result, accumulated electrical charge in the first floating diffusion region FD1 may pass to a terminal of the power supply voltage VDD, thereby resetting the voltage of the first floating diffusion region FD1.

The drive transistor DT may be used to amplify a change in the electrical potential exhibited by the first floating diffusion region FD1 and may generate a voltage (i.e., a pixel signal PIX) corresponding to a result of the amplification. The select transistor ST may be driven by a selection signal VSEL and may select pixels to be read in units of row. As the select transistor ST is turned ON, the pixel signal PIX may be provided through a column line CL.

In a general (or normally operating) environment, because the first floating diffusion region FD1 is not easily saturated, there is no need to increase the capacitance (i.e., CFD1) of the first floating diffusion region FD1. However, in high-illuminance environments, the first floating diffusion region FD1 may be easily saturated. Accordingly, in order to prevent such saturation, the dual conversion transistor DCT may be turned ON such that the first floating diffusion region FD1 and a second floating diffusion region FD2 are electrically connected. Accordingly, a capacitance of the floating diffusion regions FD1 and FD2 may be expanded to a sum of the first capacitance CFD1 and a second capacitance CFD2.

Figure 4:
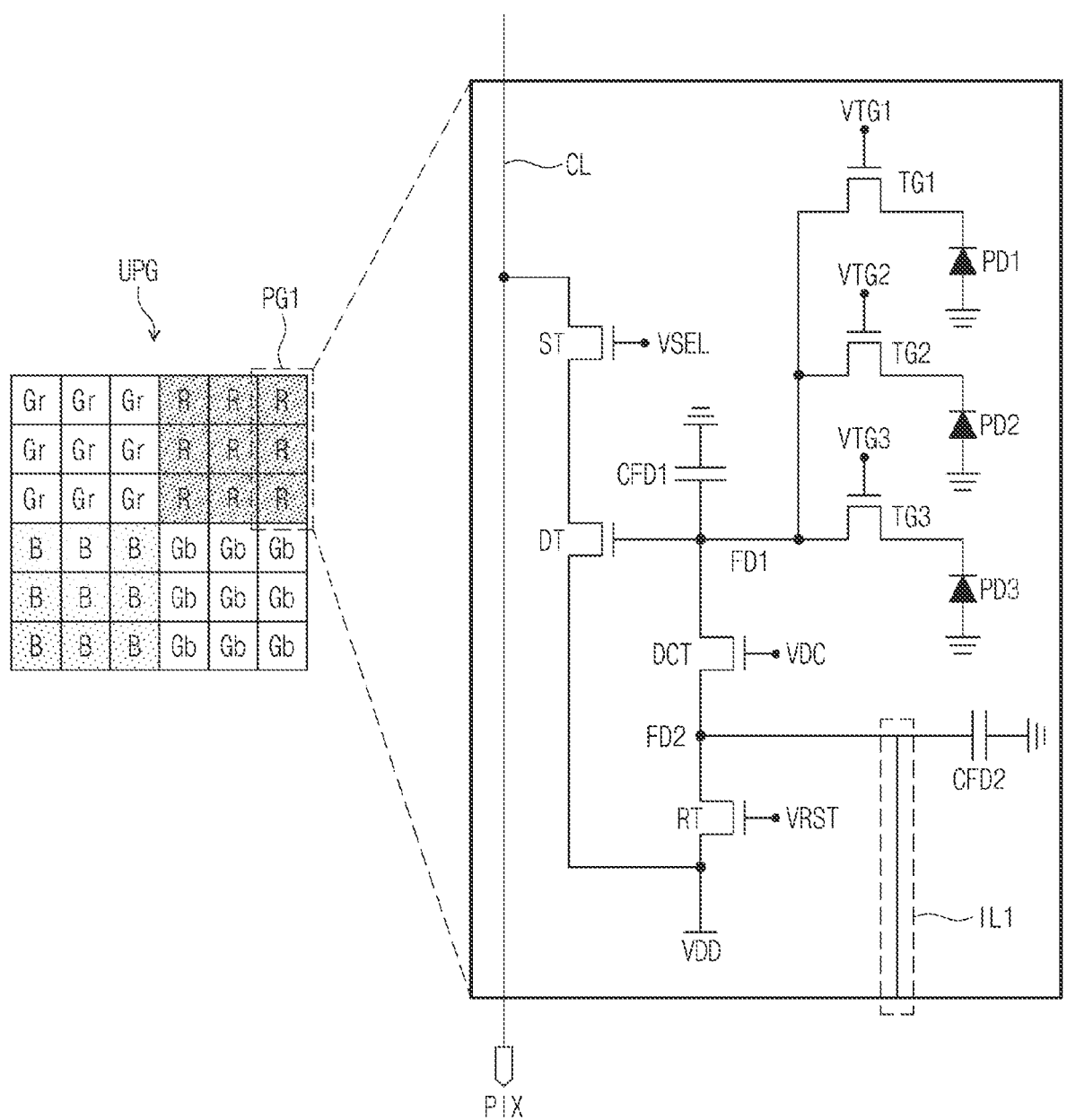

FIG. 4 is a circuit diagram illustrating in another example the first pixel group PG1 of FIG. 2. Here, however, it is assumed that the unit pixel group UPG includes 36 pixels arranged in a Nona pattern.

The unit pixel group UPG may include a plurality of pixel groups each including pixels of the same color, and pixels of the first pixel group PG1 of the plurality of pixel groups may share the same floating diffusion region (i.e., FD1).

Adjacent pixels having the same color from among pixels of the first pixel group PG1 of FIG. 3 may share one floating diffusion region, while adjacent pixels having the same color from among pixels of the first pixel group PG1 of FIG. 4 may share a plurality of floating diffusion regions. In addition, the second floating diffusion region FD2 may be electrically connected with a floating diffusion region of an adjacent pixel group (not illustrated) through a connecting line IL1. In this case, the capacitance of the first floating diffusion region FD1 may be further expanded. In this regard, the structure and operation of the pixel group of FIG. 4 is substantially similar to the structure and operation of the pixel group of FIG. 3, except as distinguished above.

Figure 5:
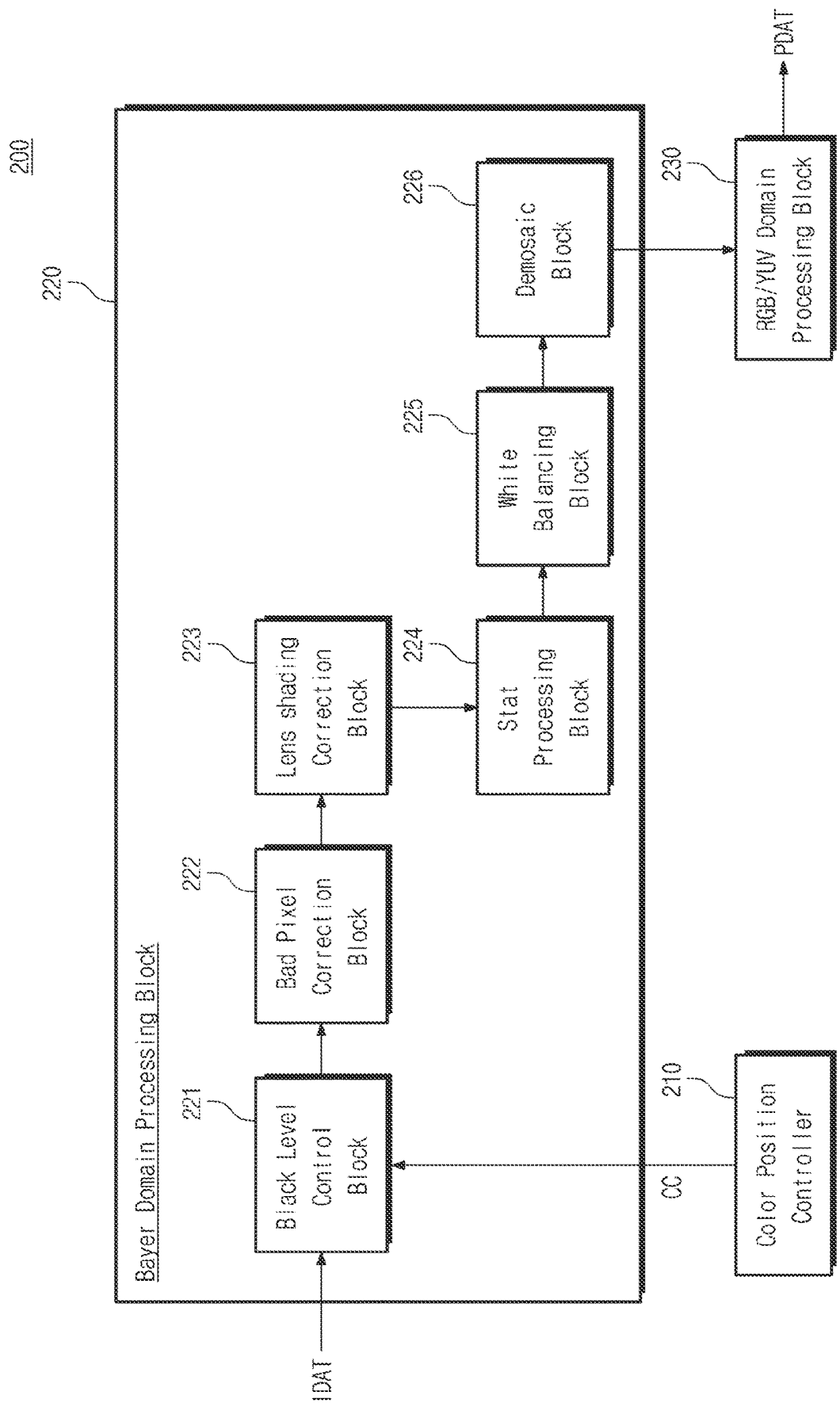
FIG. 5 is a block diagram further illustrating in one example the image signal processor of FIG. 1.

FIG. 5 is a block diagram further illustrating in one example the image signal processor 200 of FIG. 1.

Here, the image signal processor 200 may include the color position controller 210, a Bayer domain processing block 220, and a RGB/YUV domain processing block 230. (Here, the term "YUV" is used to denote an alternate color model to the RGB color model, wherein 'Y' is a luminance component, 'U' is a blue projection component and 'V' is a red projection component). The Bayer domain processing block 220 may further include a black level control block 221, a bad pixel correction block 222, a lens shading correction block 223, a stat processing block 224, a white balancing block 225, and a demosaic block 226.

The Bayer domain processing block 220 may process data associated with 1-channel, or "1-channel data." In this regard, the term "1-channel data" denotes pixel data associated with one color (e.g., R, G, or B). That is, the components of the Bayer domain processing block 220 may process data associated with "R", "G", or "B", and 3-channel data (i.e., RGB data) may ultimately be generated as a processing result of the demosaic block 226. Further in this regard, the term "3-channel data" denotes pixel data associated with three colors (e.g., R, G, and B). Accordingly, the Bayer domain processing block 220 may be understood as a 1-channel domain processing block.

The black level control block 221 may correct a value of a noise occurring in image data due to various factors such as heat, readout, etc.

The bad pixel correction block 222 may calculate image data associated with a bad pixel using image data from pixels proximate to (or around) a pixel that has previously been determined to be a bad pixel.

The lens shading correction block 223 may correct a brightness difference according to position of a lens.

The stat processing block 224 may process various statistics including deviations from same which are necessary (or useful) in the performance of auto-focus, auto-exposure, and auto-white balance functions.

The demosaic block 226 may generate 3-channel RGB data using data (i.e., at least one of R, G, and B data) associated with a target pixel (e.g., data associated with "R" pixels around the target pixel, data associated with "G" pixels, and/or data associated with "B" pixels).

The RGB/YUV domain processing block 230 may perform various processing in relation to the 3-channel data provided by the Bayer domain processing block 220. For example, the RGB/YUV domain processing block 230 may perform color correction, gamma correction, denoise, sharping, etc. The RGB/YUV domain processing block 230 may be understood as a 3-channel domain processing block in relation to various processing performed on 3-channel data.

Here, it should be noted that the processing order of operations implied by the foregoing description, as well as the designation of various functions, may vary by design according to embodiments of the inventive concept. For example, one or more of the operations ascribed to the Bayer domain processing block 220 may be performed instead by the RGB/YUV domain processing block 230.

The operations performed by the Bayer domain processing block 220 may depend on a color of the image data IDAT received by the Bayer domain processing block 220. For example, a brightness value difference according to lens position may be corrected using lens shading correction, and a value to be multiplied by the corresponding component (i.e., a brightness value) of the image data IDAT may vary depending on pixel color. As well as the lens shading correction block 223, processing operations performed by the blocks 221, 223, 224, 225, and 226 may also depend on a color of the image data IDAT. To this end, the Bayer domain processing block 220 may be provided with information indicating a color of the input image data IDAT (hereafter, "color information"), as provided by the color position controller 210.

Referring to FIGS. 2 and 5 in this regard, the color position controller 210 may calculate a value indicating that the received image data IDAT is associated with a color. For example, the image data IDAT may include coordinates of a corresponding pixel among the pixels PXs (hereafter, "pixel coordinates") of the pixel array 110, and the color position controller 210 may calculate an indexing value (CC) indicating a current color of the pixel indicated by the pixel coordinates included in the image data IDAT. Here, components of the Bayer domain processing block 220 may perform corresponding operations using various values appropriate to each color in response to the indexing value CC.

In some embodiments, the indexing value CC may be provided to a next block, together with a processing result for at least one component of the Bayer domain processing block 220. For example, the black level control block 221 may correct a black level using the indexing value CC and provide a resulting correction result, as well as the indexing value CC, to the bad pixel correction block 222. Alternatively, the color position controller 210 may provide the indexing value CC to the selected components of the Bayer domain processing block 220.

Figure 6:
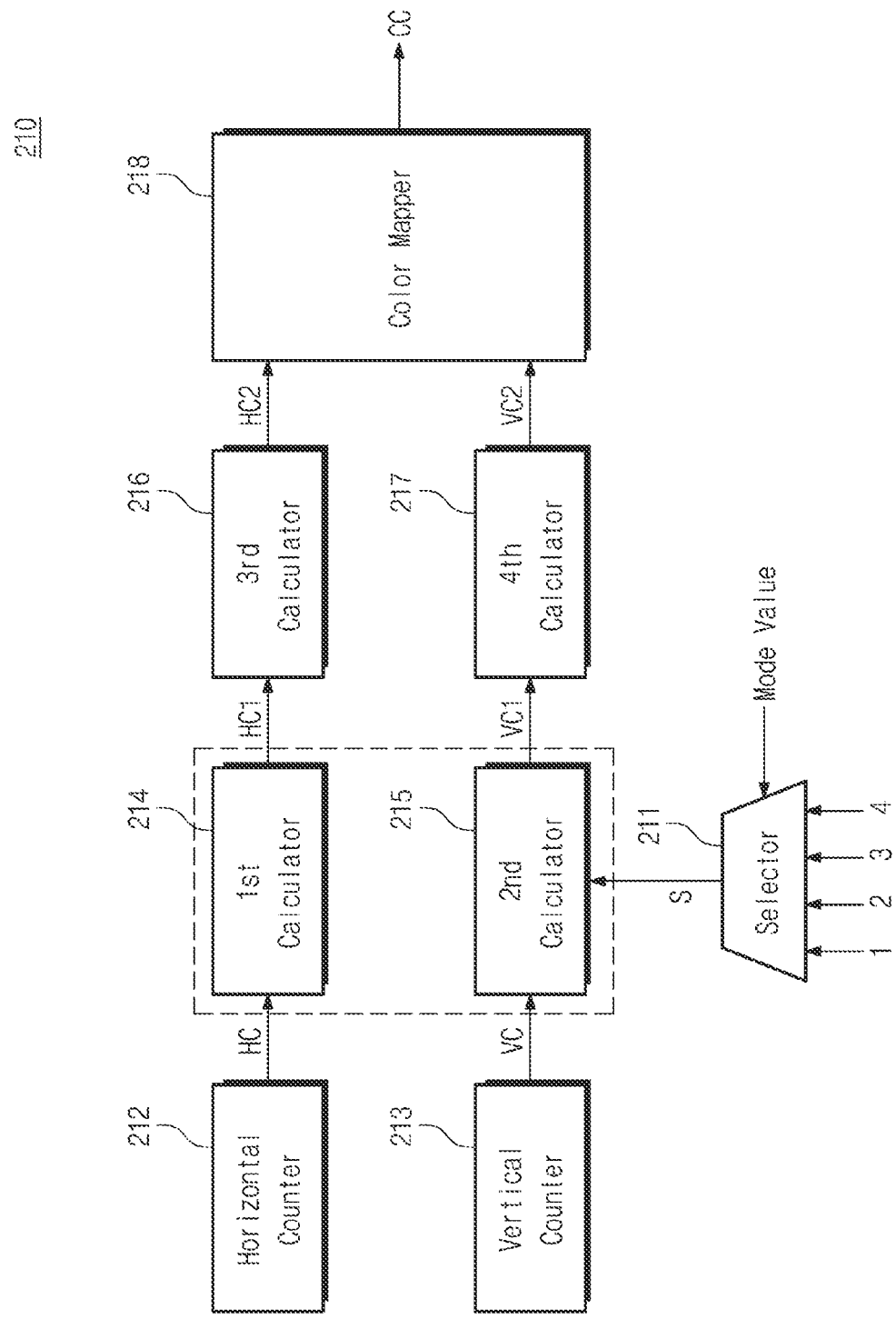
FIG. 6 is a block diagram further illustrating in one example the color position controller of FIG. 5.
Figure 7:
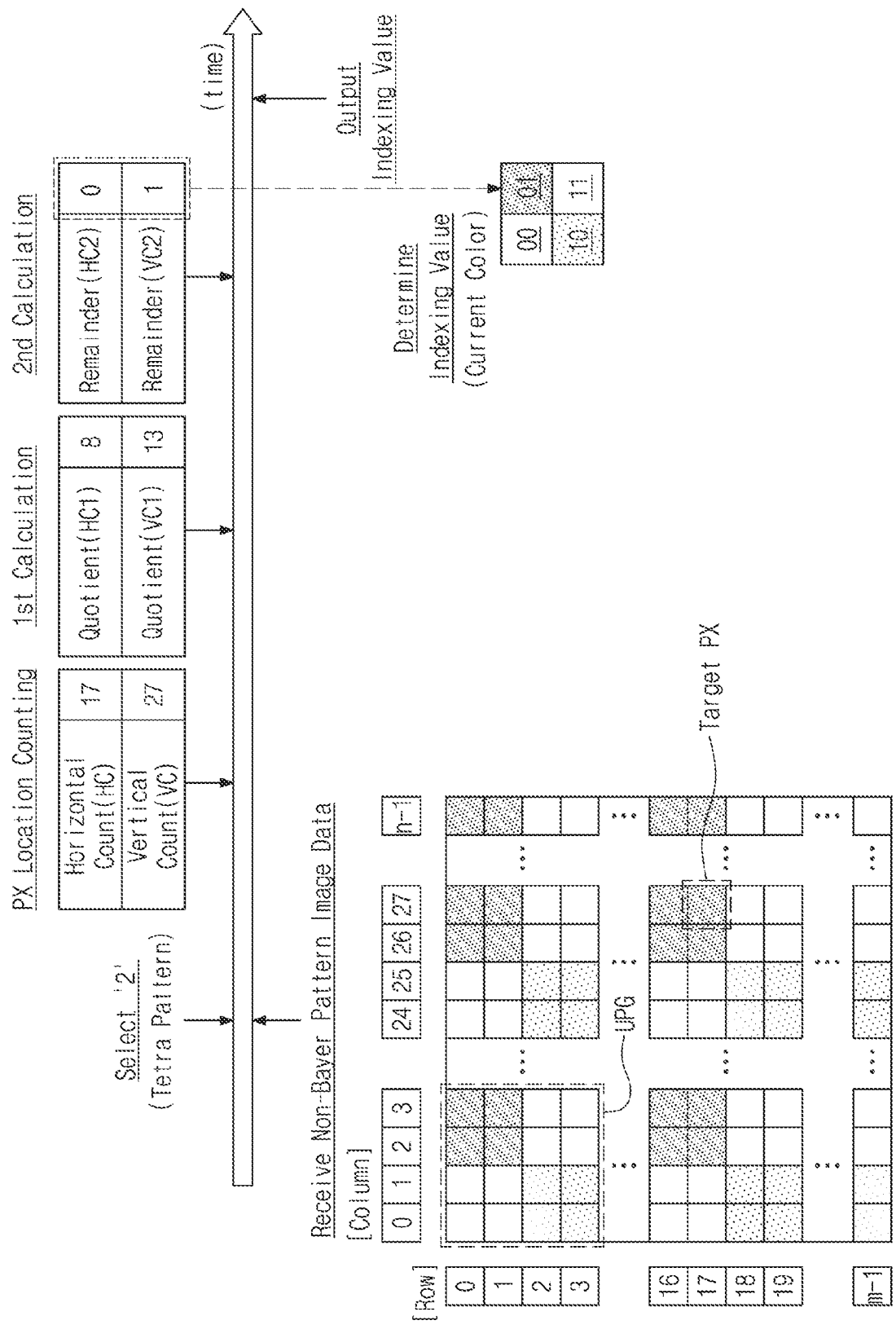
FIGS. 7 and 8 are respective, conceptual diagrams variously illustrating operation of the color position controller of FIG. 6.

FIG. 6 is a block diagram illustrating in one example the color position controller 210 of FIG. 5, and FIG. 7 is a conceptual diagram illustrating operation of the color position controller 210 of FIG. 6.

Here, the color position controller 210 may include a selector 211, a horizontal counter 212, a vertical counter 213, a first calculator 214, a second calculator 215, a third calculator 216, a fourth calculator 217, and a color mapper 218.

Referring to FIGS. 1, 2, 5, 6 and 7, the selector 211 may receive a mode value from the image sensor 100, and may determine a value corresponding to the received mode value. For example, a mode value of "1" may indicate that the image sensor 100 includes pixels having a Bayer pattern, a mode value of "2" may indicate that the image sensor 100 includes pixels having a tetra pattern, a mode value of "3" may indicate that the image sensor 100 includes pixels having a Nona pattern, and a mode value of "4" may indicate that a unit pixel group UPG includes 32 green pixels, 16 red pixels, and 16 blue pixels.

Accordingly, in some embodiments, the conceptual diagram of FIG. 7 may be understood as being associated with the image signal processor 200 which is capable of processing image data provided from the image sensor 100 including pixels arranged in a tetra pattern. Thereafter, the selector 211 may be assumed to select the mode value of "2".

Alternatively, in other embodiments, the image signal processor 200 may be dedicated for use in relation to the image sensor 100 of specific type, and the color position controller 210 may omit the selector 211. For example, where the image signal processor 200 is only used in relation to a tetra pattern-based image sensor, a mode value of "2" may be fixed, and may be used in a first calculation and a second calculation, as described in some additional detail hereafter.

The horizontal counter 212 may count a row of the coordinates of a pixel associated with the image data IDAT, and the vertical counter 213 may count a column of the coordinates of the pixel associated with the image data IDAT. For example, in a case wherein a pixel array includes a matrix of m-by-n pixels, a first counting value of the horizontal counter 212 may be "0", the last counting value of the horizontal counter 212 may be "m−1", a first counting value of the vertical counter 213 may be "0", the last counting value of the vertical counter 213 may be "n−1". For example, assuming a case wherein a target pixel under processing of the image signal processor 200 is disposed at an 18th row and a 28th column, a counting value of the horizontal counter 212 may be "17", and a counting value of the vertical counter 213 may be "27".

The first calculator 214 may perform a first calculation on a counting value of the horizontal counter 212 and a value (i.e., 2) selected by the selector 211. The second calculator 215 may perform a second calculation on a counting value of the vertical counter 213 and the value selected by the selector 211. Herein, the first calculation may refer to calculation for obtaining a quotient when a dividend is divided by a divisor. The first calculator 214 may generate a quotient obtained by dividing a counting value HC of the horizontal counter 212 by a selected value "S" as a calculation result HC1 in the first calculation, and the second calculator 215 may generate a quotient obtained by dividing a counting value VC of the vertical counter 213 by the selected value "S" as a calculation result VC1 in the first calculation.

For example, as illustrated in FIG. 7, in the case wherein the target pixel under processing of the image signal processor 200 is disposed at the 18th row and the 28th column, the counting value HC and the counting value VC may be "17" and "27", respectively. The calculation result HC1 of the first calculator 214 may be "8", and the calculation result VC1 of the second calculator 215 may be "13".

The third calculator 216 may perform the second calculation on the calculation result HC1 and the specific value (i.e., 2). The fourth calculator 217 may perform the second calculation on the calculation result VC1 and the specific value (i.e., 2). Herein, the second calculation may refer to a calculation obtaining a remainder when a dividend is divided by a divisor. The third calculator 216 may generate the remainder obtained by dividing the calculation result HC1 by the specific value (i.e., 2) as a calculation result HC2 in the second calculation, and the fourth calculator 217 may generate a remainder obtained by dividing the calculation result VC1 by the specific value (i.e., 2) as a calculation result VC2 in the second calculation. For example, in the embodiment of FIG. 7, a value of the calculation result HC2 may be "0", and a value of the counting value VC2 may be "1".

The color mapper 218 may determine the indexing value CC indicating a color of the target pixel by using the calculation results HC2 and VC2. For example, when the calculation results HC2 and VC2 are (0, 0) or (1, 1), the target pixel may be a green pixel; when the calculation results HC2 and VC2 are (0, 1), the target pixel may be a red pixel; when the calculation results HC2 and VC2 are (1, 0), the target pixel may be a blue pixel. For example, in the embodiment of FIG. 7, because when the calculation results HC2 and VC2 are (0, 1), the target pixel may be determined to be a red pixel. The color mapper 218 may generate the indexing value CC indicating a color of the target pixel to the Bayer domain processing block 220.

Here, from the foregoing example, it will be appreciated that a determination of whether a particular pixel to be processed by the image signal processor 200 is a pixel having a particular color may be made in a fairly straightforward manner. That is, an operation performed by the image signal processor 200 and requiring different processing in accordance with color type may made very simply and without expenditure of inordinate resources. Additionally, data loss potentially according as the result of unnecessary conversion non-Bayer pattern image data into Bayer pattern image data may be prevented, and the overall image quality may be improved.

Figure 8:
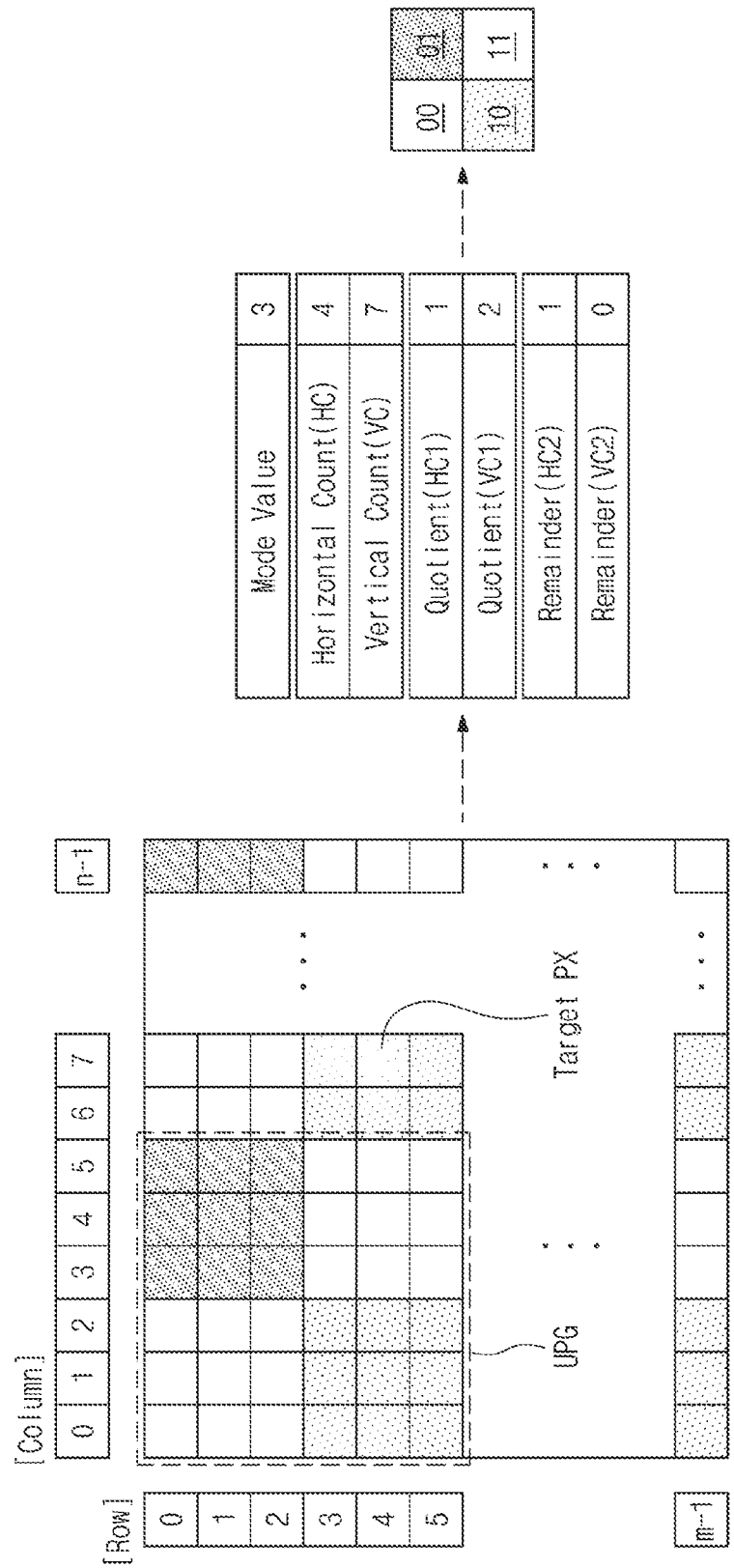

FIG. 8 is another conceptually diagram illustrating operation of the color position controller 210 of FIG. 6. Here, however, the embodiment of FIG. 8 is drawn to an example in which the image signal processor 200 processes image data received from the image sensor 100 having pixels arranged in a Nona pattern.

Accordingly, in some embodiments, in a case wherein a target pixel under processing by the image signal processor 200 is disposed at a 5th row and an 8th column, a counting value of the horizontal counter 212 may be "4", and a counting value of the vertical counter 213 may be "7".

The first calculator 214 may perform the first calculation on a counting value (i.e., 4) of the horizontal counter 212 and a mode value of "3", as selected by the selector 211, and "1" may be generated as the calculation result HC1. The second calculator 215 may perform the first calculation on a counting value (i.e., 7) of the vertical counter 213 and the mode value (i.e., 3) selected by the selector 211, and "2" may be generated as the calculation result VC1.

The third calculator 216 may perform the second calculation on the calculation result HC1 (i.e., 1) of the first calculator 214, and "1" may be generated as the calculation result HC2. The fourth calculator 217 may perform the second calculation on the calculation result VC1 (i.e., 2) of the second calculator 215 and "0" may be generated as the calculation result VC2.

Finally, in response to that the calculation results HC2 and VC2 are (0, 1), the color mapper 218 may determine that the target pixel is a red pixel. The color mapper 218 may generate the indexing value CC indicating a color of the target pixel to the Bayer domain processing block 220.

Figure 9:
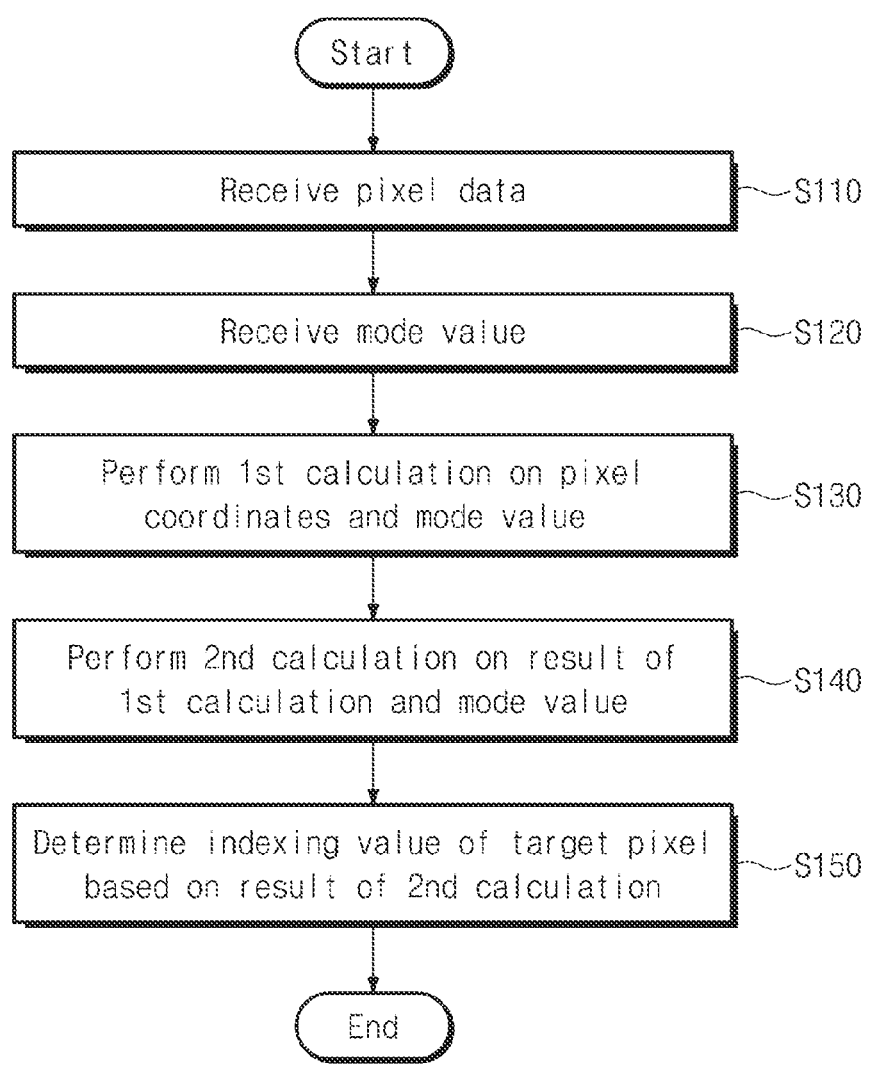
FIG. 9 is a flowchart illustrating operation of an image signal processor according to embodiments of the inventive concept.

FIG. 9 is a flowchart illustrating operation of an image signal processor according to embodiments of the inventive concept.

Referring to FIGS. 1, 2, 5, 6, 7, 8 and 9, the image signal processor 200 may receive pixel data (S110). For example, pixel data may be provided by image sensor 100 having a Bayer pattern, a tetra pattern, or a Nona pattern (S110).

The image signal processor 200 may receive a mode value associated with a type of the image sensor from an external source (e.g., an application processor) (S120). Here, in some embodiments, the image signal processor 200 may be used in accordance with one of various types of image sensors and an appropriate mode value. Alternatively, the image signal processor 200 may be used only in accordance with a particular type of image sensor and a fixed mode value. In some embodiments, the image signal processor 200 may operate in response to a mode value stored in a register or memory associated with the image signal processor 200, as opposed to receiving the mode value from an external source.

The first calculator 214 and the second calculator 215 may perform the first calculation on pixel coordinates associated with a target pixel and the mode value (S130). For example, a result of the first calculation may be a quotient obtained by dividing the coordinates of the target pixel by the mode value. The first calculator 214 and the second calculator 215 may provide the first calculation result HC1 and the first calculation result VC1, respectively.

The third calculator 216 and the fourth calculator 217 may perform the second calculation on the calculation results HC1 and VC1 and the mode value (S140). For example, a result of second calculation may be a reminder obtained by dividing each of the calculation results HC1 and VC1 by the mode value. The third calculator 216 and the fourth calculator 217 may generate the second calculation result HC2 and the second calculation result VC2, respectively.

The color mapper 218 may determine an indexing value indicating a color of the target pixel in response to the second calculation results HC2 and VC2 (S150).

Consistent with the foregoing example, a determination of whether a pixel associated with a Bayer pattern or associated with a non-Bayer pattern is a pixel of a particular color may be readily determined using a 2-bit indexing value. Thereafter, the Bayer domain processing block 220 may perform various additional processing in relation to the indexing value, such that value(s) suitable to the particular pixel color may be corrected.

Figure 10:
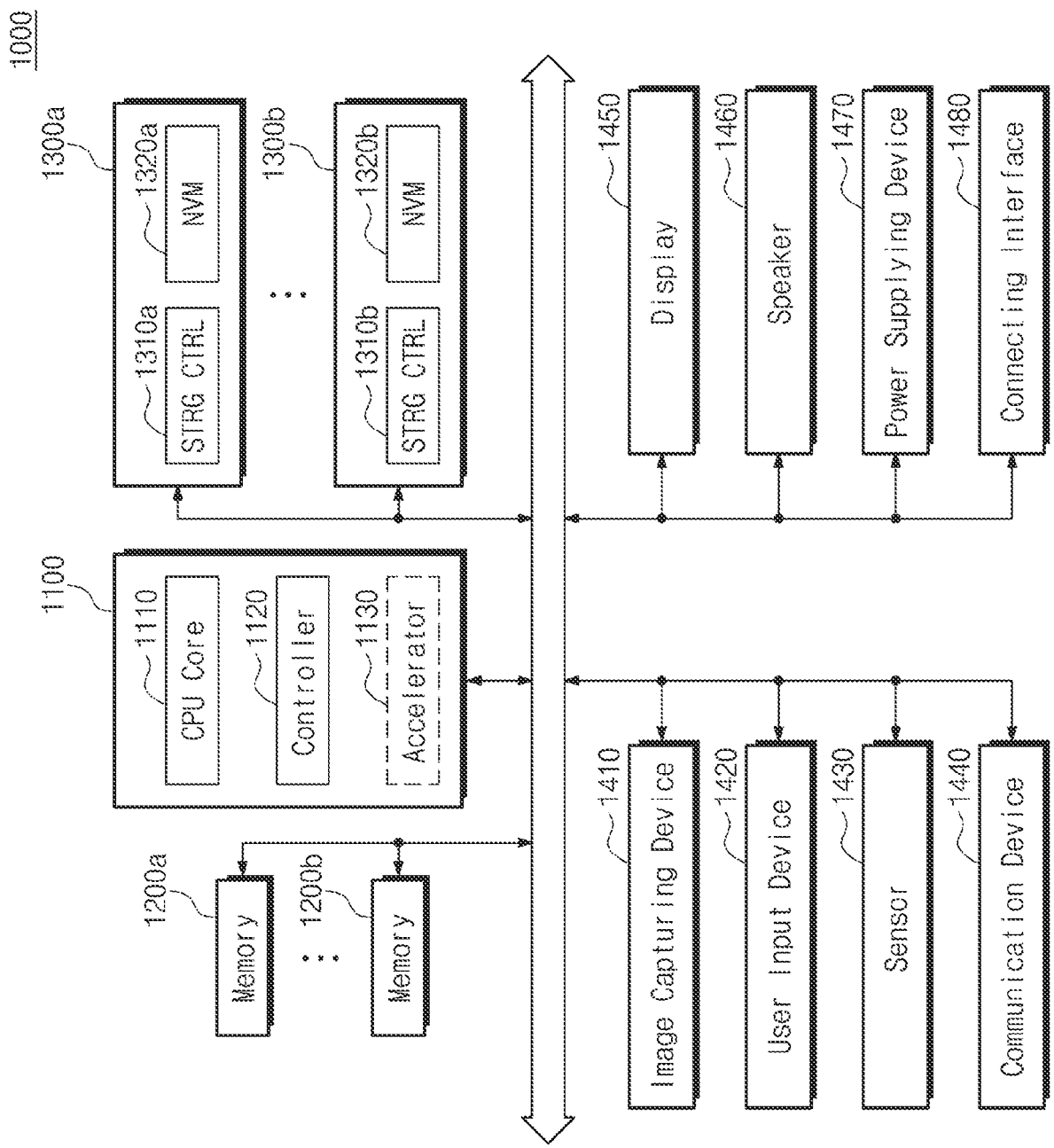
FIG. 10 is a block diagram illustrating a system according to embodiments of the inventive concept.

FIG. 10 is a block diagram illustrating a system 1000 according to embodiments of the inventive concept. The system 1000 of FIG. 10 may be a mobile system such as a mobile phone, a smartphone, a tablet personal computer (PC), a wearable device, a health care device, or an Internet of things (IoT) device. However, the system 1000 of FIG. 10 is not limited to mobile systems. For example, the system 1000 may be implemented as a personal computer, a laptop computer, a server, a media player, or an automotive device such as a navigation system.

Referring to FIG. 10, the system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supplying device 1470, and a connecting interface 1480.

The main processor 1100 may control overall operation of the system 1000, as well as operation of other components within the system 1000. The main processor 1100 may be implemented using a general-purpose processor, a special-purpose processor, or an application processor. For example, the main processor 1100 may provide the image capturing device 1410 with a mode value associated with a particular type of image sensor.

The main processor 1100 may include one or more CPU cores 1110, and may further include a controller 1120 for controlling the memories 1200a and 1200b, and/or the storage devices 1300a and 1300b. In some embodiments, the main processor 1100 may further include an accelerator 1130 being a dedicated circuit for high-speed data computation such as artificial intelligence (AI) data computation. The accelerator 1130 may include a graphics processing unit (GPU), a neural processing unit (NPU), and/or a data processing unit (DPU) and may be implemented with a separate chip physically independent of any other component of the main processor 1100.

In some embodiments, some of the operations performed by the image signal processor 200 may be performed using the main processor 1100. For example, at least some of the operations performed by the RGB/YUV domain processing block 230 may be performed using the main processor 1100. Alternatively, at least some of the operation performed by the RGB/YUV domain processing block 230 and the operations performed by the Bayer domain processing block 220 may be performed using the main processor 1100.

The memories 1200a and 1200b may be used as a main memory of the system 1000. The memories 1200a and 1200b may include a volatile memory such as a synchronous random access memory (RAM) (SRAM) and/or a dynamic RAM (DRAM), and/or a non-volatile memory such as flash memory, a phase-change RAM (PRAM), and/or a resistive RAM (RRAM). The memories 1200a and 1200b may be implemented within the same package as the main processor 1100.

The storage devices 1300a and 1300b may function as a non-volatile storage device storing data regardless of whether a power is supplied thereto, and may be higher in capacity than the memories 1200a and 1200b. The storage device 1300a may include a storage controller 1310a and a non-volatile memory 1320a storing data under control of the storage controller 1310a, and the storage device 1300b may include a storage controller 1310b and a non-volatile memory 1320b storing data under control of the storage controller 1310b. Each of the non-volatile memories 1320a and 1320b may include a flash memory of a two-dimensional (2D) structure or a V-NAND flash memory of a three-dimensional structure or may include different kinds of non-volatile memories such as a PRAM and/or a RRAM.

The storage devices 1300a and 1300b may be included in the system 1000 in a state of being physically separated from the main processor 1100 or may be implemented within the same package as the main processor 1100. Also, the storage devices 1300a and 1300b may be implemented in the form of a solid state drive (SSD) or a memory card so as to be removably connected with any other components of the system 1000 through an interface such as the connecting interface 1480 to be described later. The storage devices 1300a and 1300b may include a device to which the standard such as universal flash storage (UFS), embedded multimedia card (eMMC), or non-volatile memory express (NVMe) is applied, not limited thereto.

The image capturing device 1410 may capture a still image or a video. The image capturing device 1410 may include the image processing device 10 described above. Accordingly, the image capturing device 1410 may include various types of image sensors and at least one image signal processor. The image capturing device 1410 may receive a mode value associated with a type of an image sensor from the main processor 1100, and the mode value may be used to determine a color of a target pixel.

The user input device 1420 may receive various types of data as input by a user of the system 1000 using a touch pad, a keypad, a keyboard, a mouse, and/or a microphone.

The sensor 1430 may detect various types of physical quantities capable of being obtained from the outside of the system 1000 and may convert the detected physical quantities to electrical signals. The sensor 1430 may include a temperature sensor, a pressure sensor, an illumination sensor, a position sensor, an acceleration sensor, a biosensor, and/or a gyroscope sensor.

The communication device 1440 may transmit and receive signals to and from external devices of the system 1000 in compliance with various communication protocols. The communication device 1440 may be implemented to include an antenna, a transceiver, and/or a MODEM.

The display 1450 and the speaker 1460 may function as an output device providing visual and/or auditory information to the user of the system 1000.

The power supplying device 1470 may appropriately convert a power supplied from a battery (not illustrated) embedded in the system 1000 and/or an external power source so as to be supplied to each component of the system 1000.

The connecting interface 1480 may provide the connection between the system 1000 and an external device, which is connected with the system 1000 and exchanges data with the system 1000. The connecting interface 1480 may be implemented with various interfaces such as an Advanced Technology Attachment (ATA) interface, an Serial ATA (SATA) interface, an external SATA (e-SATA) interface, a Small Computer Small Interface (SCSI) interface, a Serial Attached SCSI (SAS) interface, a Peripheral Component Interconnection (PCI) interface, a PCI express (PCIe) interface, a NVM express (NVMe) interface, an IEEE 1394 interface, a Universal Serial Bus (USB) interface, an Secure Digital (SD) card interface, a Multi-Media Card (MMC) interface, an embedded Multi-Media Card (eMCC) interface, a Universal Flash Storage (UFS) interface, an embedded Universal Flash Storage (eUFS) interface, and a Compact Flash (CF) card interface.

In the above embodiments, components according to embodiments of the inventive concept are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to embodiments of the inventive concept, because an image signal processor may directly process image data having a non-Bayer pattern without converting the non-Bayer pattern image data into Bayer pattern image data, the potential data loss of data due to such conversion may be prevented, along with the attend expenditure of related time, electrical power and system resources.

While the inventive concept has been described with reference to embodiments thereof, it will be apparent to those of ordinary skill in the art that various changes and modifications may be made thereto without departing from the scope of the inventive concept as set forth in the following claims.

What is claimed is:

1. An image signal processor comprising:
 a color position controller configured to determine an indexing value indicating a color of a target pixel in non-Bayer pattern image data based on pixel coordinates of the target pixel and a first value indicating a mode value for an image sensor providing the non-Bayer pattern image data, wherein the mode value corresponds to a spatial pattern according to which pixels are arranged in the image sensor;
 a Bayer domain processing block configured to process the non-Bayer pattern image data based on the indexing value to generate 3-channel data; and
 an RGB/YUV domain processing block configured to generate 3-channel pixel data based on the 3-channel data.

2. The image signal processor of claim 1, wherein the color position controller is configured to:
 perform a first calculation on the pixel coordinates and the first value to generate a first calculation result;
 perform a second calculation on the first calculation result and a second value to generate a second calculation result; and
 determine the indexing value indicating the color of the target pixel based on in the second calculation result.

3. The image signal processor of claim 2, wherein the first calculation includes a calculation obtaining a quotient through a division operation, and the second calculation includes a calculation obtaining a remainder through the division operation.

4. The image signal processor of claim 3, wherein the second value is 2.

5. The image signal processor of claim 1, wherein the color position controller includes:
 a selector configured to select the first value;
 a horizontal counter configured to count a row of the pixel coordinates and generate a first counting value;
 a vertical counter configured to count a column of the pixel coordinates and generate a second counting value;
 a first calculator configured to generate a quotient obtained by dividing the first counting value by the first value, as a first calculation value;
 a second calculator configured to generate a quotient obtained by dividing the second counting value by the first value, as a second calculation value;
 a third calculator configured to generate a remainder obtained by dividing the first calculation value by a second value, as a third calculation value;
 a fourth calculator configured to generate a remainder obtained by dividing the second calculation value by the second value, as a fourth calculation value; and
 a color mapper configured to determine the indexing value indicating the color of the target pixel based on the third calculation value and the fourth calculation value.

6. The image signal processor of claim 5, wherein the second value is 2.

7. The image signal processor of claim 1, wherein the Bayer domain processing block includes:
 a demosaic block configured to generate the 3-channel data based on the non-Bayer pattern image data.

8. The image signal processor of claim 7, wherein the Bayer domain processing block includes at least one of:
 a black level control block configured to correct a noise value of the non-Bayer pattern image data based on the indexing value;
 a bad pixel correction block configured to calculate image data corresponding to a bad pixel from among the non-Bayer pattern image data based on the indexing value; or
 a lens shading correction block configured to correct a brightness difference according to position of a lens based on the indexing value.

9. The image signal processor of claim 1, wherein the RGB/YUV domain processing block is configured to perform at least one of color correction, gamma correction, denoise, or sharping with respect to the 3-channel data provided by the Bayer domain processing block.

10. The image signal processor of claim 1, wherein the spatial pattern according to which the pixels are arranged is a tetra pattern or a Nona pattern.

11. An image processing device comprising:
an image sensor including pixels arranged in a non-Bayer pattern and configured to generate non-Bayer pattern image data in response to electrical signals generated by the pixels; and
an image signal processor configured to:
determine an indexing value indicating a color of a target pixel among the pixels, based on a first value indicating a mode value for the image sensor, wherein the mode value corresponds to a spatial pattern according to which the pixels are arranged in the image sensor, and
directly process the non-Bayer pattern image data based on the indexing value.

12. The image processing device of claim 11, wherein the image signal processor includes:
a color position controller configured to generate a first calculation result based on pixel coordinates of the target pixel and the first value, generate a second calculation result based on the first calculation result and a second value, and determine the indexing value in response to the second calculation result;
a Bayer domain processing block configured to process the non-Bayer pattern image data based on the indexing value and generate 3-channel data; and
an RGB/YUV domain processing block configured to output 3-channel pixel data based on the 3-channel data.

13. The image processing device of claim 12, wherein the color position controller includes:
a selector configured to select the first value;
a horizontal counter configured to count a row of the pixel coordinates and generate a first counting value;
a vertical counter configured to count a column of the pixel coordinates and generate a second counting value;
a first calculator configured to generate a quotient obtained by dividing the first counting value by the first value, as a first calculation value;
a second calculator configured to generate a quotient obtained by dividing the second counting value by the first value, as a second calculation value;
a third calculator configured to generate a remainder obtained by dividing the first calculation value by the second value, as a third calculation value;
a fourth calculator configured to generate a remainder obtained by dividing the second calculation value by the second value, as a fourth calculation value; and
a color mapper configured to determine the indexing value indicating the color of the target pixel based on the third calculation value and the fourth calculation value.

14. The image processing device of claim 13, wherein the second value is 2.

15. The image processing device of claim 12, wherein the Bayer domain processing block includes at least one of:
a black level control block configured to correct a noise value of the non-Bayer pattern image data based on the indexing value;
a bad pixel correction block configured to calculate image data corresponding to a bad pixel among the non-Bayer pattern image data;
a lens shading correction block configured to correct a brightness difference according to position of a lens based on the indexing value; or
a demosaic block configured to generate the 3-channel data based on the non-Bayer pattern image data.

16. A method of processing image data in an image signal processor, the method comprising:
receiving non-Bayer pattern image data from an image sensor;
receiving a first value indicating a mode of the image sensor, wherein the mode corresponds to a spatial pattern according to which pixels are arranged in the image sensor;
determining an indexing value indicating a color of a target pixel among the non-Bayer pattern image data, based on pixel coordinates for the target pixel and the first value; and
providing the indexing value to a Bayer domain processing block of the image signal processor.

17. The method of claim 16, wherein the determining of the indexing value includes:
performing a first calculation on the pixel coordinates and the first value to generate a first calculation result;
performing a second calculation on the first calculation result and a second value to generate a second calculation result; and
determining the indexing value based on the second calculation result.

18. The method of claim 16, wherein the determining of the indexing value includes:
counting a row of the pixel coordinates to generate a first counting value;
counting a column of the pixel coordinates to generate a second counting value;
generating a quotient obtained by dividing the first counting value by the first value, as a first calculation value;
generating a quotient obtained by dividing the second counting value by the first value, as a second calculation value;
generating a remainder obtained by dividing the first calculation value by a second value, as a third calculation value;
generating a remainder obtained by dividing the second calculation value by the second value, as a fourth calculation value; and
determining the indexing value based on the third calculation value and the fourth calculation value.

19. The method of claim 16, further comprising at least one of:
correcting a noise value of the non-Bayer pattern image data based on the indexing value;
calculating image data corresponding to a bad pixel among the non-Bayer pattern image data; or
correcting a brightness difference according to position of a lens based on the indexing value.

20. The method of claim 16, wherein the spatial pattern according to which the pixels are arranged is a tetra pattern or a Nona pattern.

* * * * *